(12) United States Patent
Pope

(10) Patent No.: US 6,442,916 B1
(45) Date of Patent: Sep. 3, 2002

(54) SENSING SYSTEM FOR AN AGRICULTURAL COMBINE

(75) Inventor: Glenn E. Pope, Viola, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/716,069

(22) Filed: Nov. 17, 2000

(51) Int. Cl.⁷ .............................................. A01D 75/28
(52) U.S. Cl. ................................................... 56/10.2 R
(58) Field of Search ........................ 56/10.2 R, 10.2 B, 56/10.2 C, 10.2 J, 16.4 R, 16.4 A, DIG. 15; 340/684; 460/4, 5

(56) References Cited

U.S. PATENT DOCUMENTS 3,610,252 A * 10/1971 DeCoene
4,360,998 A * 11/1982 Somes ...................... 56/10.2 R
5,015,997 A * 5/1991 Strubbe ....................... 340/684
6,119,442 A * 9/2000 Hale ......................... 56/10.2 H

* cited by examiner

Primary Examiner—Robert E. Pezzuto
(74) Attorney, Agent, or Firm—Brinks Hofer Gilson & Lione

(57) ABSTRACT

A sensing system for an agricultural combine that measures crop material flow between the threshing system and the sieves. A number of sampling positions are provided along the longitudinal axis of the threshing system. A sensing member with a vibration sensor is provided at each sampling position to measure the volume of material flow between the threshing system and the sieves. In a rotary threshing system the sensing members are hollow tubes that are radially shaped to wrap around a portion of the outside of the concave or the grate.

24 Claims, 3 Drawing Sheets

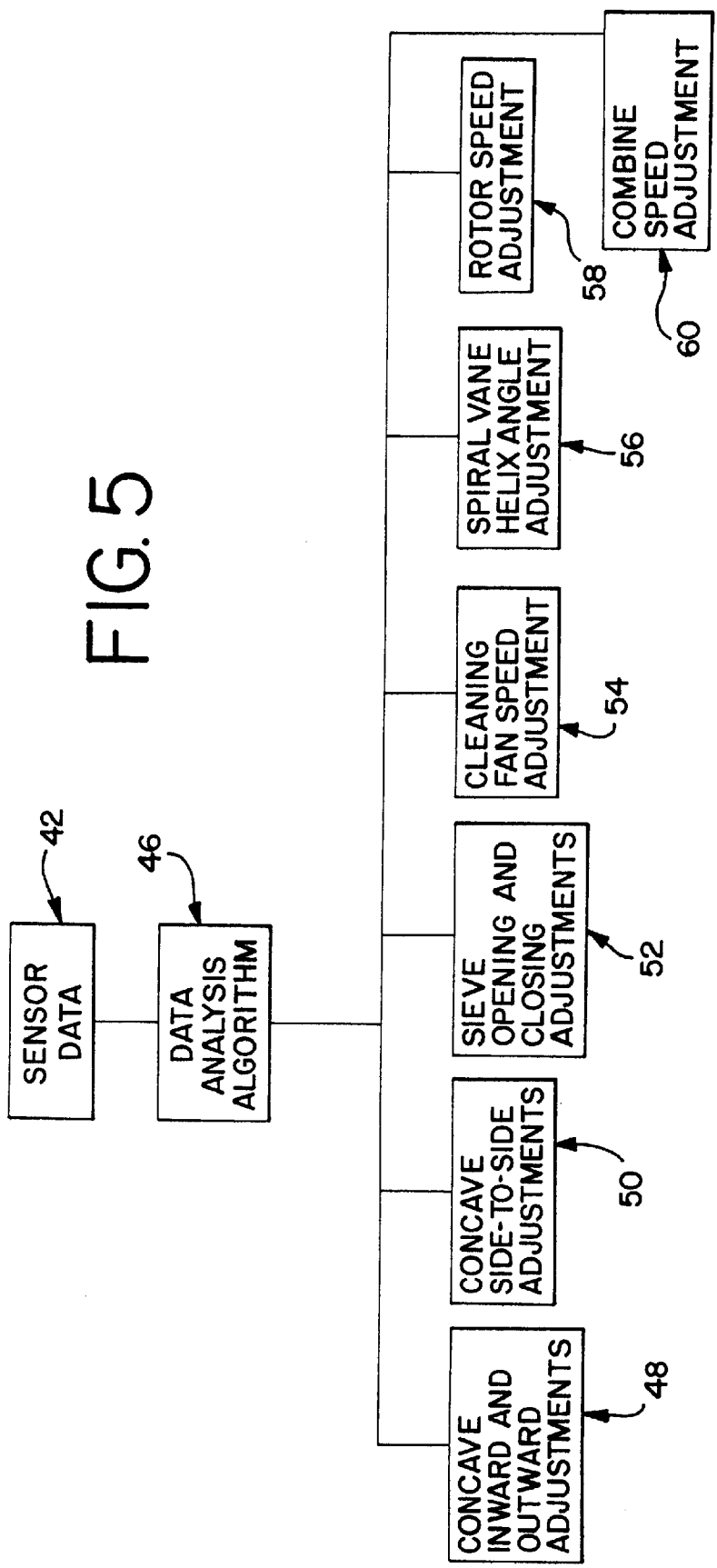

SENSING SYSTEM FOR AN AGRICULTURAL COMBINE

FIELD OF THE INVENTION

The present invention relates generally to agricultural combines. It relates particularly to the threshing assembly in a rotary combine.

BACKGROUND OF THE INVENTION

An agricultural combine is a common and well-known machine for harvesting crop materials. Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the crop field. The header then feeds the crop materials rearwardly to a threshing apparatus. One type of threshing apparatus that is well-known to those skilled in the art is a rotary thresher. In such a system, the crop materials are introduced to the front end of a rotor assembly, which is oriented longitudinally within the combine body with the rear end positioned angularly upwards from the front end. The crop materials are then threshed in the annular space between a rotating rotor and the inside of a rotor housing.

Along the exterior of the rotor is a series of rasp bars which repeatedly, but gently, strike the crop plants as they spiral through the annular space between the rotor and rotor housing. The rasp bars also cooperate with spiral vanes along the interior of the rotor housing so that the crop plants feed rearward through the rotor assembly.

As the crop materials feed through the rotor assembly, the fine materials are separated from the course materials. Typically, the fine materials include grain, partial grain heads, and broken pieces of crop stalks; while the course materials include crop stalks, leaves, and empty grain heads. The unwanted course materials continue their rearward travel through the rotor assembly and are discharged out from the rotor assembly's rear end. On the other hand, the fine materials pass through openings in the concave and grate which are positioned along the bottom side of the rotor housing. These materials are then further separated in an area below the rotor assembly by a series of moving sieves in conjunction with a forced air flow. After final separation, the grain is directed to an onboard grain bin through an augering system, with the unwanted fine materials, sometimes referred to as chaff, being discharged out the rear end of the sieves.

The effectiveness of the threshing system can have a significant impact on the success of a farm's harvesting operations. For example, the efficiency of the threshing system directly affects the time required to complete the harvest. Typically, farmers prefer the harvesting operations to proceed as quickly as possible. One reason that a quick harvest is desirable is the unpredictability of the weather and the risk of losing a portion of the crop due to rain, snow, wind, or hail. Another reason for this urgency is the high cost of the harvesting operation, which includes the cost of combines, trucks, and labor. By operating quickly and efficiently, a farmer can lower the cost of the harvesting operation by harvesting a larger area of land with the same equipment and manpower. Therefore, threshing systems which separate grain and non-grain materials more quickly are desirable.

In addition, grain losses have an adverse impact on the financial profits of the harvesting operations. Grain losses occur when the threshing system fails to separate some of the grain from the non-grain materials. This unseparated grain is then discharged from the threshing system along with the non-grain materials and is spread back onto the crop field where it is left unrecovered. Farmers are particularly concerned with grain losses because the grain yield from the harvest disproportionately affects the farmer's profits. Typically, the harvest represents the farmer's sole source of revenue, which necessarily must be sufficient to cover all the costs that the farmer has expended to raise the crop. Crop losses, thus, directly reduce the farmer's profits by reducing the amount of recovered grain that can be sold. Therefore, threshing systems which minimize the amount of lost grain are desirable.

Grain damage also directly reduces the farmer's financial revenues from the harvesting operations. Grain damage occurs when the mechanical threshing system repeatedly strikes the grain with a sufficient impact to crack the grain into fragments. Typically, the amount of damaged grain increases as the grain is threshed longer in the rotor assembly. Thus, greater amounts of grain damage are usually experienced near the rear end of the rotor than at the front end. Damaged grain is less valuable to grain consumers, however. As a result, the farmer receives a lower price if the grain includes an unacceptably high level of fragmented grain. Therefore, a threshing system which minimizes grain damage by quickly separating the grain near the front end of the rotor is desirable.

Manufacturers of combines commonly provide a number of different adjustments that can be made to the threshing system in order to achieve an optimal balance of efficiency, grain loss, and grain damage. For example in one adjustment, the position of the concave can be changed to modify the shape of the annular threshing space between the rotor and the concave. This adjustment is used to balance the flow of fine materials through the concave and grate, which then fall onto the sieves. Experience has shown that the sieves operate most efficiently when a shallow mat of crop material is spread across the top of the sieves. Optimally, this mat will be thick enough to prevent the cleaning fan air from escaping through the sieves but will be thin enough to allow the grain to sink down through the mat. Additionally, the optimal mat will spread evenly across the width of the sieves but will be somewhat thicker towards the front of the sieves and thinner towards the rear of the sieves. Typically, the concave can be repositioned both in a vertical direction and a side-to-side direction in order to achieve a desired material flow from the rotor assembly to the sieves. Thus, by adjusting the concave inward towards the rotor's axis, a greater amount of fine materials will drop to the sieves along the front end. On the other hand, by adjusting the concave outward and away from the rotor, the material flow to the sieves will move rearward along the axis of the rotor. In a like fashion the concave can be adjusted side-to-side to balance the material flow laterally along the width of the sieves.

The sieves are also adjustable by either pivoting them towards a closed position or pivoting them towards an open position. Generally, the sieves are adjusted based on the amount of crop material that falls from the concaves. Thus, when a large amount of material falls to the sieves, the sieves will be opened in a wide position to accommodate the extra material. On the other hand, the sieves will be closed in a narrower position when smaller amounts of materials fall to the sieves.

Similarly, the speed of the cleaning fan can be adjusted to accommodate the volume of material flow from the rotor assembly. In this case, more airflow is needed when large amounts of material are present on the sieves. When smaller amounts of material are present, the fan speed is decreased for less air flow.

In another adjustment, the angle of the spiral vanes on the inside or the rotor housing can be changed. The angle of the spiral vanes determines the rate at which the crop materials travel rearward through the annular threshing space. Similar to the theory of a screw thread, a high spiral angle causes the crop materials to feed more quickly through the rotor assembly; whereas a low spiral angle slows the feed rate through the rotor assembly. This adjustment, therefore, causes the material flow to the sieves to be moved forward or rearward along the axis of the rotor.

In a final set of adjustments, the rotational speed of the rotor and the travel speed of the combine can be changed in order to increase or decrease the material flow through the concave and the grate to the sieves. Thus, increasing the speed of the rotor directly increases material flow to the sieves, and decreasing the speed of the rotor correspondingly decreases material flow to the sieves. Likewise, changes to the speed of the combine cause similar increases and decreases of material flow to the sieves.

While a number of threshing adjustments are available, the combine operator usually has only a limited amount of information available as he attempts to choose an optimal combination of the adjustment settings. Traditionally, the operator has relied primarily on simple visual clues in determining what combine adjustments to make. One such clue that the operator can use is an inspection of the harvested grain in the combine's onboard storage bin. For example, if the grain sample includes an excess of either damaged grain or non-grain materials, the operator will make adjustments accordingly. The operator can also inspect the ground surface of the harvested crop field for discharged grain to determine how much grain has been lost. Additionally, the operator commonly changes the spread of the combine as he travels through the field based on a visual determination of crop conditions.

These techniques of gathering information, however, are imprecise and are poorly suited for making ongoing adjustments during combining operations. As a result, combine operators typically settle on a balance of adjustments that are believed to be sufficient for a wide range of threshing situations. Operators also avoid making adjustments in the middle of combining operations and instead prefer to choose a single set of adjustments which remain unchanged during the harvesting operations.

Some manufacturers have attempted to provide combine operators with additional information on the performance of the threshing system to enable more accurate selection of threshing adjustments. One such system is a grain loss sensor that informs the operator how much grain is being discharged from the rear end of the rotor assembly. Typically, these sensors include a sensing member along a rear end of the rotor assembly that registers the number of grain seed impacts against the sensing member. The operator can then estimate the amount of grain that is being lost from the rotor's discharge end. These sensors, however, are of minimal usefulness because the information that is provided is limited in scope.

A more useful type of data would be detailed information about the flow of materials between the rotor assembly and the sieves. Preferably, this data would provide information on the dispersal pattern of the grain which passes through the concave and the grate. Based on this data, an optimal set of adjustments could then be chosen for the threshing system in order to maximize the effectiveness of the sieves.

BRIEF SUMMARY OF THE INVENTION

Accordingly, it is an object of the invention to provide a control system including a plurality of sensing members along the longitudinal axis of the threshing system that measures the volume of crop material flow between the threshing system and the sieves.

It is a further object of the invention to provide a control system that uses the measurements of crop material flow to automatically change the threshing system adjustments.

According to the invention, a number of sensing members are provided along the longitudinal axis of a rotary thresher. Each sensing member is a hollow tube that is shaped in a radial form that wraps along the outside of the concave or grate. Installed within each of the hollow tubes is a vibration sensor that can measure vibrations in the hollow tube that occur when crop materials strike the tube. Thus, the sensing members can measure the crop flow which passes through the concave and the grate from the rotor assembly to the sieves.

The data from the sensing members is used to control a number of adjustments to the threshing system in order to achieve optimal separation performance. One embodiment provides a user-readable output of the measurement of crop material flow, which an operator can use to manually change the threshing system's adjustments. Another embodiment provides a control system that automatically changes the threshing system's adjustments based on the measurement of crop material flow.

BRIEF DESCRIPTION OF SEVERAL VIEWS OF THE DRAWINGS

The invention, including its construction and method of operation, is illustrated more or less diagrammatically in the drawings, in which:

FIG. 5 is a schematic of an alternative embodiment of a control system which automatically changes threshing system adjustments.

DETAILED DESCRIPTION OF THE INVENTION

Figure 1:
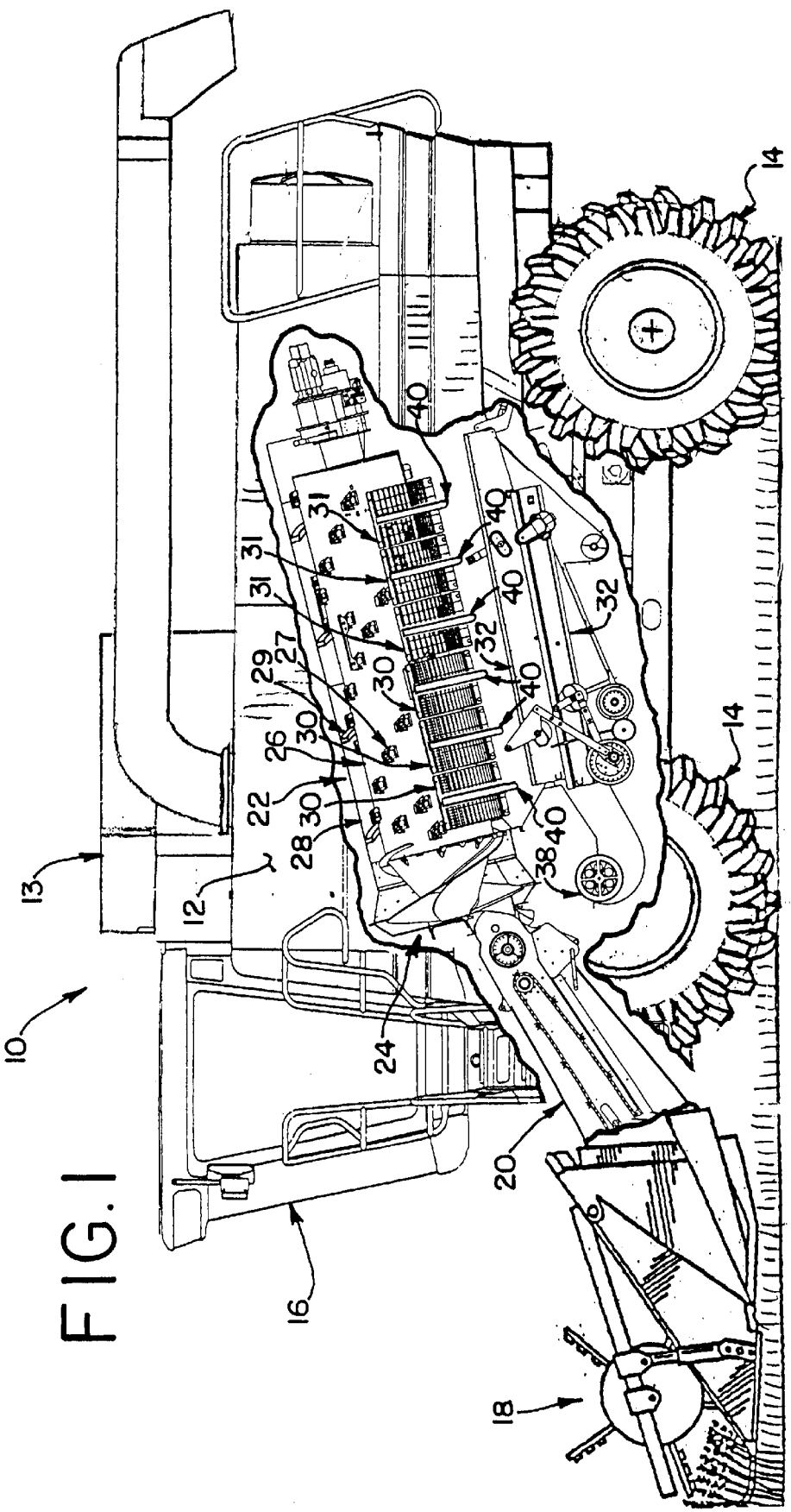
FIG. 1 is a side elevational view of an agricultural combine, showing part of the combine body broken away to illustrate the rotor assembly and sieves.

Referring now to the drawings, and particularly to FIG. 1, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10. At the forward end of the combine 10 is a crop harvesting header 18 that severs and gathers the ripened crop materials from the crop field. After cutting the stems of the crop materials or collecting the crop materials from a prepared windrow, the crop materials are fed rearward through a feeder housing 20 to the threshing assembly 22.

Although a variety of threshing systems are known to those skilled in the art, the preferred embodiment of the invention includes a rotary threshing assembly 22. In such a system, the crop materials are fed into the forward end of the assembly 22. An impeller 24 is attached to the forward end of the rotor 26 to assist entrance of the crop materials. Spiral vanes 29 attached to the top side of the interior of the rotor housing 28 induce rearward movement of the crop materials through an annular space between the stationary rotor housing 28 and the rotating rotor 26. As the crop materials travel rearward, they are threshed by a series of rasp bars 27 or other threshing elements attached to the exterior of the rotor 26.

Along the bottom side of the rotor housing 28 is a concave 30 and a grate 31 which have perforated openings that allow grain and other fine materials to pass through and away from the rotor assembly 22. Larger materials, such as crop stalks, continue rearward through the rotor assembly 22 and are discharged out the rear end of the rotor assembly 22.

After falling through the concave 30 or the grate 31, the grain and other fine materials land on top of a series of sieves 32 located below the rotor assembly 22. A driving mechanism (not indicated) creates a constant, reciprocating motion between the sieves 32 so that as the crop materials pass through the sieves, a number of vanes (not shown) attached to the sieves 32 further separate the grain from the unwanted chaff and other fine materials. After passing through the sieves 32, the grain falls to the bottom of the combine body 12 and is augured up to an onboard storage bin 13. A cleaning fan 38 located forward of the sieves 32 blows forced air across the sieves 32, which helps to separate the grain from the fine materials. The cleaning fan 38 also discharges the unwanted fine materials out the rear end of the sieves 32.

Experience has shown that the sieves 32 operate most efficiently when a shallow mat of crop materials is spread on top of the sieves 32. Optimally, the thickness of this mat will be even across the width of the sieves 32 and will be somewhat thicker near the front of the sieves 32 than towards the rear of the sieves 32. A number of threshing system adjustments are available, which are well-known in the art, for modifying the thickness and the placement of this mat of crop materials. Thus, by selecting appropriate settings for each of these adjustments, a combine operator can improve combine 10 efficiency by ensuring that an optimal mat of crop materials is provided on the sieves 32.

In one threshing system adjustment, the relative position of the concave 30 to the rotor 26 can be changed. The concave 30 is located forward of the non-adjustable grate 31 and may be moved inward or outward from the rotor's axis or may be moved side-to-side. In another adjustment, the vanes 33 of the sieves 32 may be pivoted between opened or closed positions. The cleaning fan 38 speed may also be increased or decreased. In still another adjustment, the angle of the spiral vanes 29 can be changed. Finally, the rotational speed of the rotor 26 or the travel speed of the combine 10 can be changed.

Figure 2:
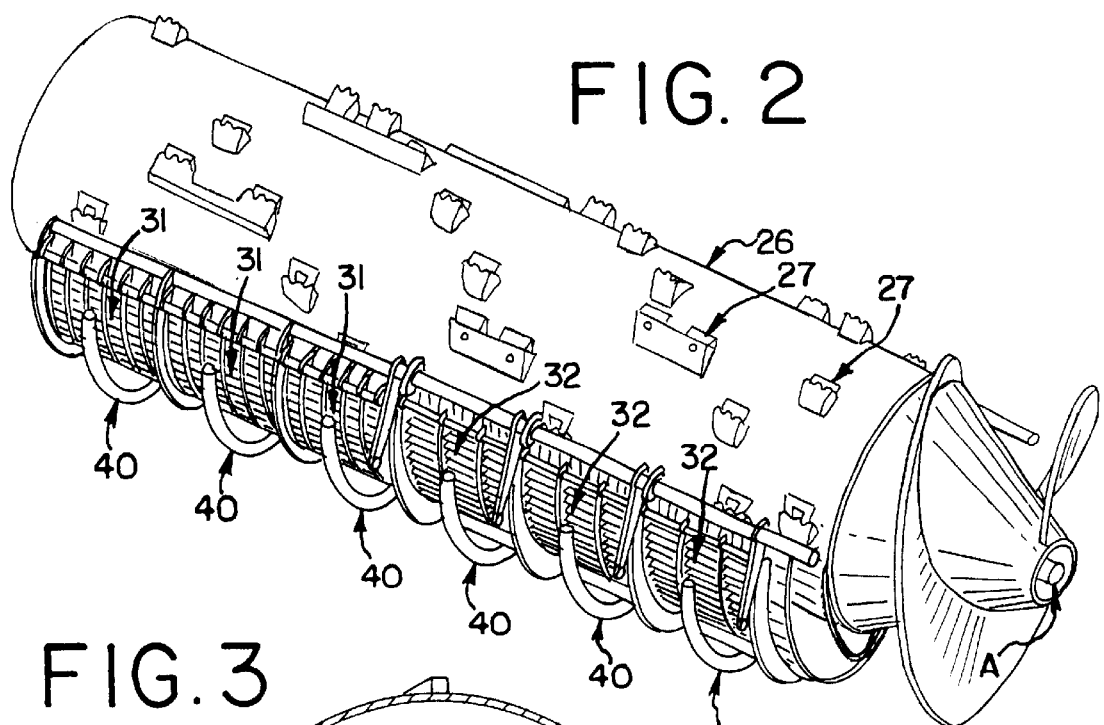
FIG. 2 is a perspective view of a rotor, showing a concave and grate positioned below the rotor with sensing members positioned below the concave and the grate.
Figure 3:
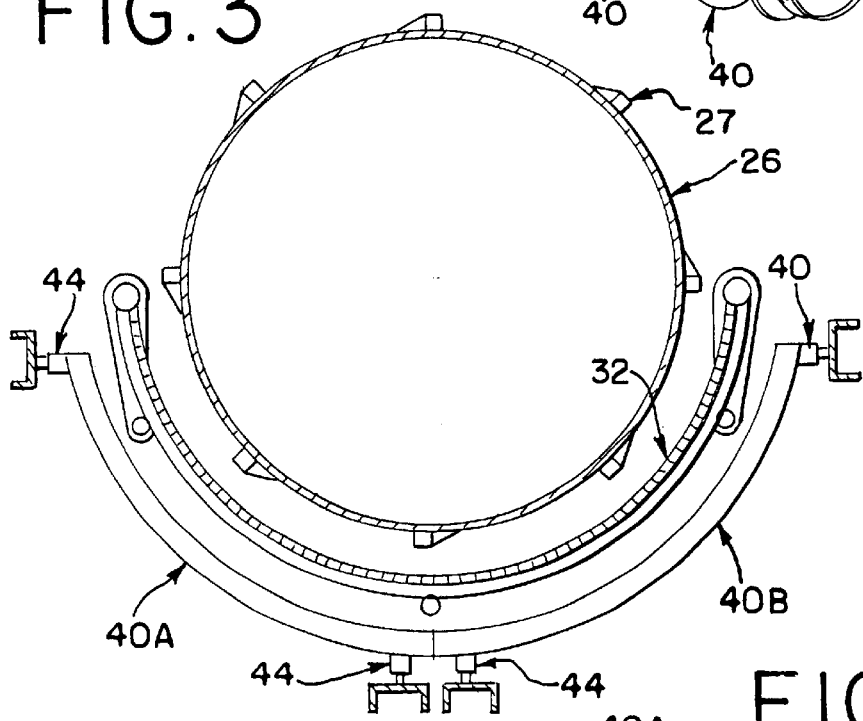
FIG. 3 is a front sectional view of FIG. 2.
Figure 4:
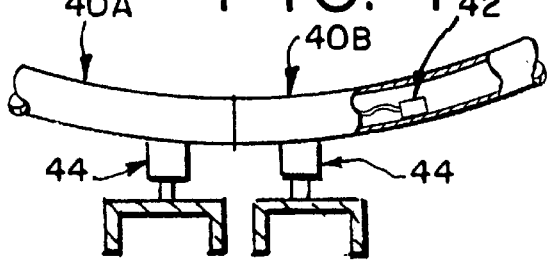
FIG. 4 is an enlarged view of a sensing member; showing part of the tube surface broken away to illustrate the vibration sensor.

Turning now to FIGS. 2 through 4, in the present invention a plurality of sensing members 40 are included below the concave 30 and the grate 31. Although a variety of sampling positions are possible, the preferred embodiment includes six sensing members 40 equally spaced along the length of the rotor assembly 22.

Preferably, the sensing members 40 are hollow tubes made from stainless steel. Attached to the inside of each tube 40 is a vibration sensor 42 that can detect vibrations in the sensing tube 40. Preferably, the vibration sensor 42 is a piezoelectric sensor 42.

When crop materials strike the sensing member 40 as the materials travel between the rotor assembly 22 and the sieves 32, the vibration sensor 42 counts the number of strikes in order to determine the volume of material flow. In addition, the vibration sensor 42 distinguishes between strikes of grain seeds, grainseed fragments, and non-grain materials because the vibrational magnitudes caused by these materials differ according to their different hardnesses.

As will be seen from the figures and understood by those skilled in the art, the sensing member 40 does not provide data from the entire flow of material which travels between the rotor assembly 22 and the sieves 32. Instead, a narrow sensing member 40 measures only a sample of the material flow. The entire material flow is then estimated from the sample measurements provided by the sensing member 40. A sampling technique such as this, which uses a narrow sensing member 40, avoids excessive obstruction of the crop flow. Thus, the majority of the crop flow travels freely and unobstructed through the concave 30 and the grate 31 to the sieves 32.

Preferably, the sensing members 40 are attached to the concave 30 and the grate 31 with rubber mounts 44. The rubber mounts 44 isolate the sensing tube 40 from the rest of the combine 10 to ensure that other equipment vibrations do not interfere with the measurements of the sensing members. This allows the vibration sensors 42 to more accurately measure the vibration caused by crop material strikes.

The sensing members 40 can be configured in a number of different forms to achieve accurate measurements of the material flow. In one form, the sensing member 40 is configured in a semi-circular arc that wraps around the width of the concave 30 or the grate 31. This form allows accurate measurements of the material flow around the entire width of the concave 30 or the grate 31. In another form, two sensing members 40 are provided at each longitudinal sampling position. In this form, the first sensing member 40A extends from the bottom of the concave 30 or the grate 31 along one side of the width of the concave 30 or the grate 31. The second sensing member 40B is then isolated from the first sensing member 40A with rubber mounts 44 and extends from the bottom along the other side of the width. Thus, in this latter form of the invention, accurate material flow measurements are possible independently for each side of the rotor assembly 22 since each of the two sensing members 40A, 40B includes a separate vibration sensor 42.

The invention, therefore, provides a number of separate sample measurements of the material flow through the concave 30 and the grate 31. This data can provide an accurate representation of variations in the material flow along the length of the rotor assembly 22 and from each side of the rotor assembly 22. This information can then be used to modify the material flow or the performance of the sieves in order to achieve more efficient grain separation.

One embodiment of the invention provides a user-readable output display (not shown) of the sensor data in the operator's station 16. The operator can then manually change the threshing system adjustments. Preferably, the output display allows the operator to vary the adjustments as the combine 10 is harvesting the crop field.

In another embodiment shown in FIG. 5, a control system is included that can automatically change the threshing system adjustments. The control system includes an algorithm 46 that analyzes the data from the sensing members 40 and determines the appropriate changes to the threshing system adjustments. The algorithm 46 can then individually change each of the threshing system adjustments, such as moving the concaves inward or outward 48, moving the concaves side-to-side 50, opening or closing the sieves 52, increasing or decreasing the cleaning fan speed 54, modifying the helix angle of the spiral vanes 56, increasing or decreasing the rotor speed 58, and increasing or decreasing the combine speed 60. The preferred control system, however, simultaneously changes each of the adjustments to achieve an optimal mat of crop materials on the sieves 32. Thus, in the preferred control system, concave position 30, 48, 50; sieve opening 32, 52; cleaning fan speed 38, 54; spiral vane angle 29, 56; rotor speed 26, 58; and combine speed 10, 60 are all controlled by the control system.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

I claim:

1. In a rotary combine harvester with a front end and an opposing rear end and having a source of motive power affixed to a wheel-supported frame for movement across a field of standing crop material, a crop threshing and separating assembly supported by said frame and powered by said source of motive power, a harvesting header attached to a feeder housing affixed to the front of said combine such that standing crop material is harvested by said header, consolidated and fed into said feeder housing and delivered to said threshing and separating assembly, said threshing and separating assembly having a generally fore-and-aft extending rotor housing of generally cylindrical cross section, an elongate rotor including a generally cylindrical main body portion having a longitudinal axis and substantially uniform diameter, said rotor being rotatably mounted in said rotor housing and co-operable with said rotor housing upon rotation to provide flow of crop material through said rotor housing in a generally spiral path, an elongate grate mechanism adjustably supported within said rotor housing and extending lengthwise along and adjacent the bottom side of said rotor and partially wrapped therearound, said grate mechanism having perforated openings therethrough of such size to allow grain and other fine material to pass through and away from said rotor housing, a plurality of adjustable reciprocating sieves supported by said frame of such a size and positioned below said grate mechanism to receive the grain and other fine material passing through said perforated openings, and a transport mechanism to move the grain passing through said sieves to a storage tank on said frame, the improvement comprising:

a plurality of sensor units within said rotor housing generally equally spaced along the longitudinal axis of said rotor;

each said sensor unit located adjacent said grate mechanism between said grate mechanism and said sieves and extending along the curved surface of said grate mechanism in a plane generally perpendicular to said longitudinal axis of said rotor, to sense the flow of crop materials passing through said grate mechanism and onto said sieves;

each said sensor unit providing an electrical output signal representative of the flow of crop material; and a control unit in electrical communication with said sensor units to receive said electrical output signals.

2. The rotary combine of claim 1 wherein said sensor units each sense the vibrations caused by impacts by crop material on the sensing unit.

3. The rotary combine of claim 2 wherein said sensor units distinguish among grain seeds, grain seed fragments and non-grain crop materials.

4. The rotary combine of claim 3 wherein each said sensing unit is in a radial form, fitting generally along the curved surface of said grate mechanism.

5. The rotary combine of claim 4 further including the following adjustment features:

a). said threshing and separating mechanism includes a rotational speed control;

b). said grate mechanism includes an adjustment mechanism that selectively moves said grate mechanism inward or outward and side-to-side relative to said rotor;

c). an adjustable-speed cleaning fan is supported by said frame and arranged to force air to flow through said sieves;

d). said source of motive power includes a speed control apparatus to vary the ground speed of the combine;

e). said rotor housing includes a plurality of spiral vanes and a vane control mechanism for varying the helix angle thereof;

said control unit is electrically connected to said adjustment features; and said control unit includes an algorithm that analyzes said output electrical signals and selectively activates said adjustment features in response thereto to achieve an optimal mat of crop material on said sieves.

6. The rotary combine of claim 5 wherein each said sensing unit is comprised of a hollow tube with a vibration detecting mechanism therein.

7. The rotary combine of claim 6 wherein said hollow tube is comprised of stainless steel and said vibration detecting mechanism is a piezoelectric sensor and each said sensing unit is affixed to said grate mechanism with a dampening material.

8. The rotary combine of claim 7 wherein said sensor units are at least six in number.

9. The rotary combine of claim 4 wherein each said sensing unit is comprised of two hollow stainless steel tubes, each tube in a radial form fitting generally on the same cross sectional line and along separate halves of the curved surface of said grate mechanism.

10. The rotary combine of claim 2 further including:

a display unit connected to said control unit to display that flow information in a user-readable format.

11. A rotary combine harvester comprising:

a wheel-supported frame for movement across a field of standing crop material, said frame having a front end and an opposing rear end;

a source of motive power affixed to a wheel-supported frame;

a crop threshing and separating assembly supported by said frame and powered by said source of motive power, said threshing and separating assembly having a generally fore-and-aft extending rotor housing of generally cylindrical cross section;

an elongate rotor including a generally cylindrical main body portion having a substantially uniform diameter, said rotor having a longitudinal axis and substantially uniform diameter, said rotor being rotatably mounted in said rotor housing and co-operable with said rotor housing upon rotation to provide flow of crop material through said rotor housing in a generally spiral path;

an elongate grate mechanism adjustably supported within said rotor housing and extending lengthwise along and adjacent the bottom side of said rotor and partially wrapped therearound, said grate mechanism having perforated openings therethrough of such size to allow grain and other fine crop material to pass through and away from said rotor housing;

a plurality of adjustable reciprocating sieves supported by said frame of such a size and positioned below said grate mechanism to receive the grain and other fine crop material passing through said perforated openings;

a transport mechanism to move the grain passing through said sieves to a storage tank on said frame;

a harvesting header attached to a feeder housing affixed to the front of said combine such that standing crop material is harvested by said header, consolidated and fed into said feeder housing and delivered to said threshing and separating assembly;

a plurality of sensor units within said rotor housing generally equally spaced along the longitudinal axis of said rotor;

each said sensor unit located adjacent said grate mechanism between said grate mechanism and said sieves and extending along the curved surface of said grate mechanism in a plane generally perpendicular to said longitudinal axis of said rotor, to sense the flow of crop material passing through said grate mechanism and onto said sieves;

each said sensor unit providing an electrical output signal representative of the flow of crop material; and a control system in electrical communication with said sensor units to receive said electrical output signals.

12. The rotary combine of claim 11 wherein said sensor units each sense the vibrations caused by impacts by crop material on the sensing unit.

13. The rotary combine of claim 12 wherein said sensor units distinguish among grain seeds, grain seed fragments and non-grain crop materials.

14. The rotary combine of claim 13 wherein each said sensing unit is in a radial form, lifting generally along the curved surface of said grate mechanism.

15. The rotary combine of claim 14 further including the following adjustment features:

a). said threshing and separating mechanism includes a rotational speed control;

b). said grate mechanism includes an adjustment mechanism that selectively moves said grate mechanism inward or outward and side-to-side relative to said rotor;

c). an adjustable-speed cleaning fan is supported by said frame and arranged to force air to flow through said sieves;

d). said source of motive power includes a speed control apparatus to vary the ground speed of the combine;

e). said rotor housing includes a plurality of spiral vanes and a vane control mechanism for varying the helix angle thereof;

said control unit is electrically connected to said adjustment features; and said control unit includes an algorithm that analyzes said output electrical signals and selectively activates said adjustment features in response thereto to achieve an optimal mat of crop material on said sieves.

16. The rotary combine of claim 15 wherein each said sensing unit is comprised of a hollow tube with a vibration detecting mechanism therein.

17. The rotary combine of claim 16 wherein said hollow tube is comprised of stainless steel and said vibration detecting mechanism is a piezoelectric sensor and each said sensing unit is affixed to said grate mechanism with a dampening material.

18. The rotary combine of claim 17 wherein said sensor units are at least six in number.

19. The rotary combine of claim 14 wherein each said sensing unit is comprised of two hollow stainless steel tubes, each tube in a radial form fitting generally on the same cross sectional line and along separate halves of the curved surface of said grate mechanism.

20. The rotary combine of claim 12 further including:

a display unit connected to said control unit to display that flow information in a user-readable format.

21. A method of controlling the flow of crop material from the axially-mounted rotor and threshing and separating assembly to the sieves in a rotary combine comprising the steps of:

a. measuring the flow of crop material at each of a plurality of spaced locations along the axis of said rotor;

b. evaluating said measurements; and c. adjusting said combine to in response to said measurements.

22. The method of claim 21 wherein said step of adjusting said combine is performed automatically by a control system with an algorithm based on an analysis of said flow of crop material.

23. The method of claim 22 wherein said control system is capable of making multiple adjustments including:

a). rotational speed control of a threshing and separating mechanism;

b). position of a grate mechanism by selectively moving it inward or outward and side-to-side relative to said rotor;

c). air flow volume of a cleaning fan;

d). ground speed control of the combine; and e). variation of the helix angle of spiral vanes.

24. The method of claim 23 further including the adjustment of the opening or closing of a series of sieves.

* * * * *

UNITED STATES PATENT AND TRADEMARK OFFICE
CERTIFICATE OF CORRECTION

PATENT NO.     : 6,442,916 B1
DATED          : September 3, 2002
INVENTOR(S)    : Glenn E. Pope It is certified that error appears in the above-identified patent and that said Letters Patent is hereby corrected as shown below:

Column 9,
Line 46, delete "lifting" and substitute -- fitting -- in its place.

Signed and Sealed this

Twenty-sixth Day of August, 2003

JAMES E. ROGAN
*Director of the United States Patent and Trademark Office*